US009967016B2

(12) United States Patent
Pinheiro et al.

(10) Patent No.: US 9,967,016 B2
(45) Date of Patent: *May 8, 2018

(54) MEASUREMENT SUPPORT FOR A SMART ANTENNA IN A WIRELESS COMMUNICATION SYSTEM

(71) Applicant: InterDigital Technology Corporation, Wilmington, DE (US)

(72) Inventors: Ana Lucia A. Pinheiro, Beaverton, OR (US); Arty Chandra, Roslyn, NY (US); Inhyok Cha, Gangnam-Ku (KR); Paul Marinier, Brossard (CA); Vincent Roy, Longueuil (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/352,805

(22) Filed: Nov. 16, 2016

(65) Prior Publication Data

US 2017/0063440 A1 Mar. 2, 2017

Related U.S. Application Data

(63) Continuation of application No. 14/624,865, filed on Feb. 18, 2015, now Pat. No. 9,520,930, which is a
(Continued)

(51) Int. Cl.
*H04B 1/38* (2015.01)
*H04B 7/06* (2006.01)
(Continued)

(52) U.S. Cl.
CPC ......... *H04B 7/0632* (2013.01); *H04B 7/0408* (2013.01); *H04B 7/0695* (2013.01);
(Continued)

(58) Field of Classification Search
CPC .. H04B 7/061; H04B 17/0067; H04B 7/0417; H04B 7/0608; H04B 7/0691;
(Continued)

(56) References Cited

U.S. PATENT DOCUMENTS 4,617,657 A 10/1986 Drynan et al.
5,046,066 A 9/1991 Messenger
(Continued)

FOREIGN PATENT DOCUMENTS

CA 2 480 402 10/2003
EP 0740430 A2 4/1996
(Continued)

OTHER PUBLICATIONS

IEEE Wireless LAN Edition, A Compilation Based on IEEE Std. 802.11TM—1999 (R2003) and its amendments, pp. 1-678.
(Continued)

*Primary Examiner* — Ajibola Akinyemi
(74) *Attorney, Agent, or Firm* — Condo Roccia Koptiw LLP

(57) ABSTRACT

A method for taking measurements with a smart antenna in a wireless communication system having a plurality of STAs begins by sending a measurement request from a first STA to a second STA. At least two measurement packets are transmitted consecutively from the second STA to the first STA. Each measurement packet is received at the first STA using a different antenna beam. The first STA performs measurements on each measurement packet and selects an antenna beam direction based on the measurement results.

12 Claims, 4 Drawing Sheets

Related U.S. Application Data continuation of application No. 11/022,709, filed on Dec. 27, 2004, now Pat. No. 8,995,921.

(60) Provisional application No. 60/609,212, filed on Sep. 10, 2004.

(51) Int. Cl.

| | | |
|---|---|---|
| *H04B 7/0408* | (2017.01) | |
| *H04B 7/08* | (2006.01) | |
| *H04B 17/24* | (2015.01) | |
| *H04B 17/318* | (2015.01) | |
| *H04B 17/10* | (2015.01) | |
| *H04L 5/14* | (2006.01) | |
| *H04W 24/08* | (2009.01) | |
| *H04B 17/336* | (2015.01) | |
| *H04W 84/12* | (2009.01) | |

(52) U.S. Cl.
CPC ............ *H04B 7/088* (2013.01); *H04B 17/10* (2015.01); *H04B 17/24* (2015.01); *H04B 17/318* (2015.01); *H04L 5/14* (2013.01); *H04W 24/08* (2013.01); *H04B 7/0619* (2013.01); *H04B 17/336* (2015.01); *H04W 84/12* (2013.01)

(58) Field of Classification Search
CPC ....... H04L 1/0025; H04L 1/0026; H04L 1/06; H04L 1/1671; H04L 1/1812; H04L 1/1825; H04L 1/1854; H04L 1/1893; H04W 24/10
USPC ...................................................... 455/67.11
See application file for complete search history.

(56) References Cited

U.S. PATENT DOCUMENTS

| | | | | |
|---|---|---|---|---|
| 5,507,035 | A * | 4/1996 | Bantz .................. | H04B 7/0814 375/299 |
| 6,438,389 | B1 | 8/2002 | Sandhu et al. | |
| 6,445,688 | B1 * | 9/2002 | Garces ................. | H04B 7/0608 370/334 |
| 6,449,290 | B1 | 9/2002 | Willars et al. | |
| 6,564,036 | B1 | 5/2003 | Kasapi | |
| 6,587,441 | B1 * | 7/2003 | Urban .................. | H04L 1/1867 370/310 |
| 6,721,302 | B1 | 4/2004 | Alastalo | |
| 6,721,569 | B1 | 4/2004 | Hashem et al. | |
| 6,730,020 | B2 | 5/2004 | Peng et al. | |
| 6,738,020 | B1 | 5/2004 | Lindskog et al. | |
| 6,760,599 | B1 | 7/2004 | Uhlik | |
| 6,778,507 | B1 | 8/2004 | Jalali | |
| 6,778,844 | B2 | 8/2004 | Hood | |
| 6,791,996 | B1 | 9/2004 | Watanabe et al. | |
| 6,856,805 | B1 | 2/2005 | Raaf | |
| 6,961,545 | B2 * | 11/2005 | Tehrani ................. | H04B 7/061 455/101 |
| 7,039,356 | B2 * | 5/2006 | Nguyen .............. | H04B 7/0691 455/13.3 |
| 7,606,213 | B2 * | 10/2009 | Mishra ................. | H04L 1/1628 370/328 |
| 7,616,698 | B2 * | 11/2009 | Sun ...................... | H04B 7/0413 375/267 |
| 2001/0034236 | A1 | 10/2001 | Tong et al. | |
| 2002/0071406 | A1 | 6/2002 | Bursztejn et al. | |
| 2002/0080804 | A1 * | 6/2002 | Ando ..................... | H04L 45/00 370/401 |
| 2002/0111143 | A1 | 8/2002 | Li | |
| 2003/0025633 | A1 | 2/2003 | Cai et al. | |
| 2004/0127260 | A1 | 7/2004 | Boros et al. | |
| 2004/0155110 | A1 | 8/2004 | Ehrhart et al. | |
| 2004/0156339 | A1 | 8/2004 | Urquhart et al. | |
| 2005/0054383 | A1 * | 3/2005 | Webster .............. | H04B 7/0608 455/562.1 |
| 2005/0105504 | A1 | 5/2005 | Sakoda | |
| 2006/0029024 | A1 * | 2/2006 | Zeng .................. | H04W 52/0216 370/335 |
| 2006/0165101 | A1 | 7/2006 | Koppe et al. | |
| 2007/0051814 | A1 * | 3/2007 | Ehrhart ..................... | G06K 7/14 235/462.08 |
| 2007/0127416 | A1 * | 6/2007 | Terasawa ............. | H04B 7/2668 370/331 |
| 2010/0046555 | A1 * | 2/2010 | Elliott .................... | H04H 20/42 370/474 |

FOREIGN PATENT DOCUMENTS

| | | |
|---|---|---|
| EP | 1 215 851 | 6/2002 |
| EP | 1 335 618 | 8/2003 |
| EP | 894414 B1 | 7/2004 |
| GB | 1 335 618 | 9/2004 |
| GB | 2398964 A | 9/2004 |
| JP | 09-200115 | 7/1997 |
| JP | 10-163938 | 6/1998 |
| JP | H11-205222 A | 7/1999 |
| JP | 2001-160813 A | 6/2001 |
| JP | 2007-531259 A | 11/2007 |
| JP | 2008-512955 A | 4/2008 |
| JP | 2009-200115 A | 9/2009 |
| JP | 2011-188532 A | 9/2011 |
| WO | WO 2000/051368 | 8/2000 |
| WO | WO 2001/091338 A1 | 11/2001 |
| WO | WO 2002/099995 | 12/2002 |
| WO | WO 2003-039032 A1 | 5/2003 |
| WO | WO 2004/017657 A1 | 2/2004 |
| WO | WO 2004-042983 A | 3/2004 |
| WO | WO 2004/042983 | 5/2004 |
| WO | WO 2004/042993 A1 | 5/2004 |
| WO | WO 2004/071021 A1 | 8/2004 |
| WO | WO 05/043275 | 5/2005 |
| WO | WO 2005-093824 A1 | 10/2005 |
| WO | WO 2006/031499 A2 | 3/2006 |

OTHER PUBLICATIONS

Draft Amendment to Standard for Information Technology—Telecommunications and Information Exchange Between Systems—LAN/MAN Specific Requirements—Part 11: Wireless Medium Access Control (MAC) and Physical Layer (PHY) Specifications; Amendment 7: Radio Resource Management, Jul. 2004.

IEEE Standard for Information Technology—Telecommunications and Information Exchange Between Systems—Local and Metropolitan Area Networks—Specific Requirements; Part 11: Wireless Medium Access Control (MAC) and Physical Layer (PHY) Specifications: Amendment 7: Medium Access Control (MAC) Quality of Service (QoS) Enhancements, Aug. 2004.

IEEE Standard for Information Technology—Telecommunications and Information Exchange Between Systems—Local and Metropolitan Area Networks—Specific Requirements; Part 11: Wireless LAN Medium Access Control (MAC) and Physical Layer (PHY) specifications; Amendment 5: Spectrum and Transmit Power Management Extensions in the 5 GHz band in Europe, Oct. 2003, 72 pages.

Alastalo, IEEE 802.11-00/269, "Performance of Smart Antennas and PCF", Nokia Research Center, Sep. 2000, 18 pages.

\* cited by examiner

MEASUREMENT SUPPORT FOR A SMART ANTENNA IN A WIRELESS COMMUNICATION SYSTEM

CROSS REFERENCE TO RELATED APPLICATION

This application is the continuation of U.S. patent application Ser. No. 14/624,865 filed Feb. 18, 2015, which is a continuation of U.S. patent application Ser. No. 11/022,709 filed Dec. 27, 2004, now U.S. Pat. No. 8,995,921 issued Mar. 31, 2015, which claims the benefit of U.S. Provisional Application No. 60/609,212, filed Sep. 10, 2004, which is incorporated by reference as if fully set forth herein.

FIELD OF INVENTION

The present invention generally relates to wireless communication systems, and more particularly, to a method and apparatus for efficient measurements in utilizing a smart antenna in the wireless communication system.

BACKGROUND

In a wireless local area network (WLAN), an access point (AP) and a station (STA) may be equipped with smart antenna features; for example, a multiple beam/directional antenna system. Both the AP and the STA need to perform measurements to decide the best beam for transmitting to or receiving from another STA. STAs with multiple beams typically perform scanning on different beams in order to estimate which is the best beam to serve them. Scanning performed by the AP and/or STAs may use either a dummy packet, a data packet, an 802.11 acknowledgement (ACK), or broadcast packets. The measurements need to be updated frequently.

At an AP, the beam switching algorithm uses packets from a STA for the antenna measurements. The best beam (based on the received packet measurements, e.g., a received power or signal to interference plus noise ratio (SINR)) is then used to transmit packets to that STA. At the STA, the current beam switching algorithm may use the data packet or beacon to decide the correct receive and transmit antenna/beam for that AP. This method for antenna measurement is not very efficient, due to the amount of time needed to obtain enough measurements to decide the correct beam for each STA.

Another problem with this beam selection method is that the beam selection, for both receive and transmit, is based on measurements made on the received packets. However, in reality, the best beam for transmission might not be the same as the best beam for reception (especially for a frequency division duplex system).

SUMMARY

A method for taking measurements with a smart antenna in a wireless communication system having a plurality of STAs begins by sending a measurement request from a first STA to a second STA. At least two measurement packets are transmitted consecutively from the second STA to the first STA. Each measurement packet is received at the first STA using a different antenna beam. The first STA performs measurements on each measurement packet and selects an antenna beam direction based on the measurement results.

A method for taking measurements with a smart antenna in a wireless communication system having a plurality of STAs begins by sending a measurement request from a first STA to a second STA. At least two measurement packets are transmitted consecutively from the first STA to the second STA, each measurement packet being transmitted using a different antenna beam. The second STA receives each measurement packet and performs measurements on each measurement packet. The second STA generates a measurement report based on the measurement results and sends the measurement report to the first STA. The first STA selects an antenna beam direction based on the measurement report.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

Hereafter, the term "station" (STA) includes, but is not limited to, a wireless transmit/receive unit, a user equipment, a fixed or mobile subscriber unit, a pager, or any other type of device capable of operating in a wireless environment. When referred to hereafter, the term "access point" (AP) includes, but is not limited to, a base station, a Node B, a site controller, or any other type of interfacing device in a wireless environment.

The present invention solves the problem of not having measurement support for smart antennas and may be implemented in an AP, a non-AP STA, or both. The present invention provides a signaling mechanism to obtain received signal strength indicator (RSSI) or SINR measurements for each transmit or receive antenna between any two stations. A mechanism to correctly update the received measurements between scanning is also provided.

The present invention uses an action frame for antenna measurements by creating a new category of action frame called "Antenna Measurement". This category of action frame includes an action field for measurement request packets, measurement response packets, and dummy measurement packets. Action frames are currently defined in the WLAN standards (i.e., 802.11k, 802.11e). The measurement packets of the present invention can also be part of a separate control packet or a management packet.

Figure 1:
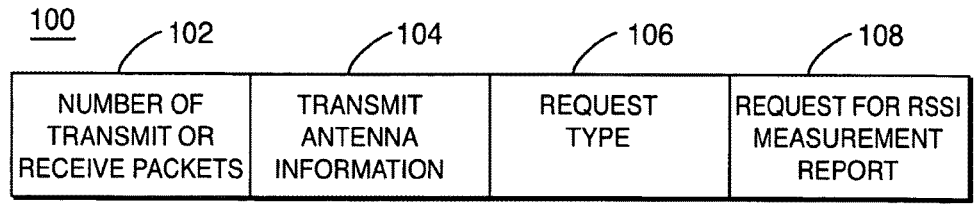
FIG. 1 is a diagram of a measurement request packet in accordance with the present invention.

FIG. 1 shows a measurement request packet 100 in accordance with the present invention. The measurement request packet 100 includes fields for the number of transmit or receive packets 102, transmit antenna information 104, request type 106, and request for measurement report 108. The number of transmit or receive packets 102 depends on parameters such as the fading environment and the time to select an antenna. In one embodiment, a preferred value is 10 packets per antenna. The transmit antenna information 104 includes the antenna beam identity or any other information that can be used to identify an antenna or set of antennas. Two possible request types 106 will be explained hereinafter in connection with FIGS. 4 and 6. However, it is noted that there are many possible ways of sending measurements and getting the response that can be indicated in the request type field 106. The request for measurement report field 108 includes a parameter for SNR measurement and a parameter for RSSI measurement.

Figure 2:
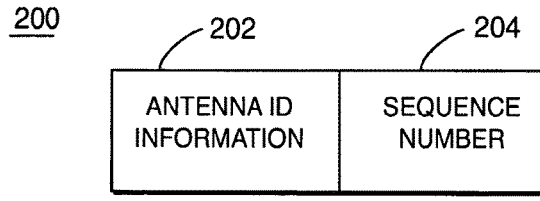
FIG. 2 is a diagram of a measurement packet in accordance with the present invention.

FIG. 2 shows a measurement packet 200 in accordance with the present invention. The measurement packet 200 includes antenna identity information 202 and sequence number of the current packet 204. The antenna identity information 202 includes the antenna beam identity or any other element that can be used to identify an antenna or set of antennas.

Figure 3:
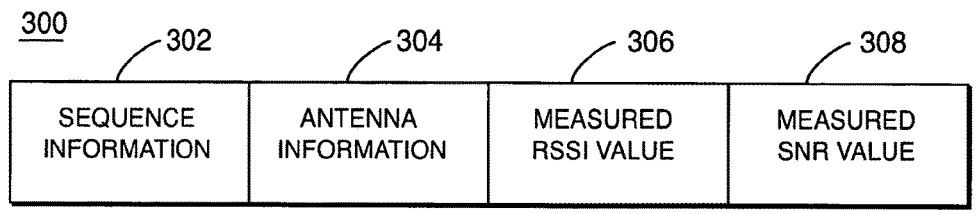
FIG. 3 is a diagram of a measurement report packet in accordance with the present invention.

FIG. 3 shows a measurement report packet 300 in accordance with the present invention. The measurement report packet 300 includes sequence information 302 (the sequence number of the packet), antenna information 304 (i.e., antenna identity information), the measured RSSI value 306, and the measured SNR value 308.

The measurement request and response can be initiated by the STA or the AP. The measurement request packet 100 and the measurement response packet 300 may be sent anytime while the STA is associated to the AP. The STA may be allowed to use these techniques of measuring the signal from each antenna and to each antenna before associating to the AP.

Figure 4:
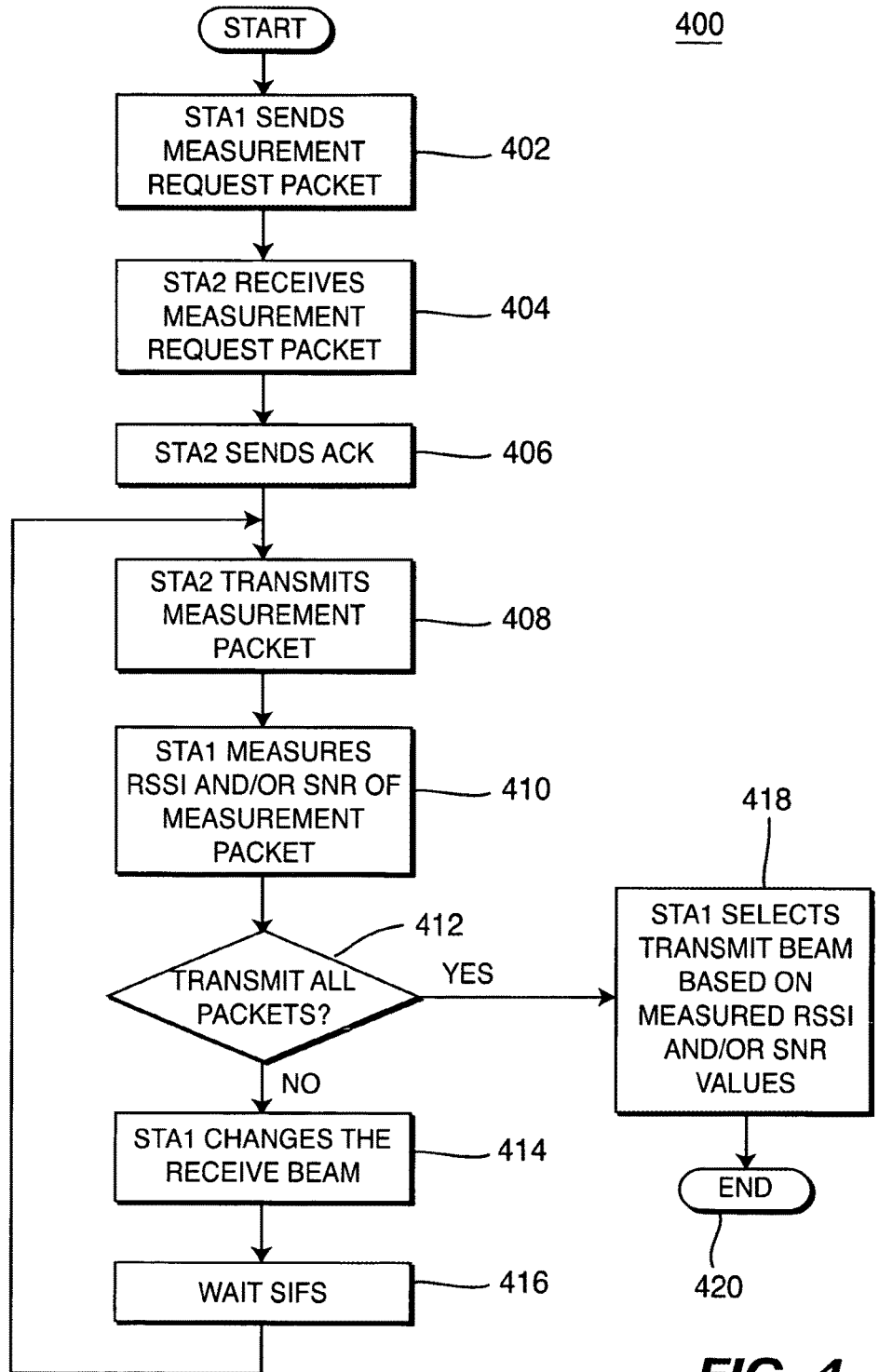
FIG. 4 is a flowchart of a method for taking antenna measurements in accordance with the present invention.

FIG. 4 is a flowchart of a method 400 for measurement packet exchange between two STAs, STA1 and STA2, in accordance with a first embodiment of the present invention. The method 400 begins with STA1 sending a measurement request packet to STA2 (step 402). STA2 receives the measurement request packet (step 404) and sends an ACK to STA1 (step 406). STA2 then transmits a measurement packet to STA1 (step 408). STA1 receives the measurement packet and measures the RSSI and/or the SNR of the measurement packet (step 410). A determination is made if all of the packets, as specified in the measurement request packet, have been transmitted (step 412).

If all of the packets have not been transmitted, then STA1 changes its receive beam (step 414). STA2 waits for a short interframe space (SIFS; step 416) before transmitting the next packet (step 408). In a preferred embodiment, STA2 waits for the SIFS; however, the wait time can vary and be either more or less than the SIFS. The variable nature of the wait period relates to the length of time needed to switch antenna beams, the accuracy of the system clock, and any other implementation-specific timing issues. If all of the packets have been transmitted (step 412), then STA1 selects the transmit beam based on all of the measured RSSI and/or the SNR values (step 418) and the method terminates (step 420).

Figure 5:
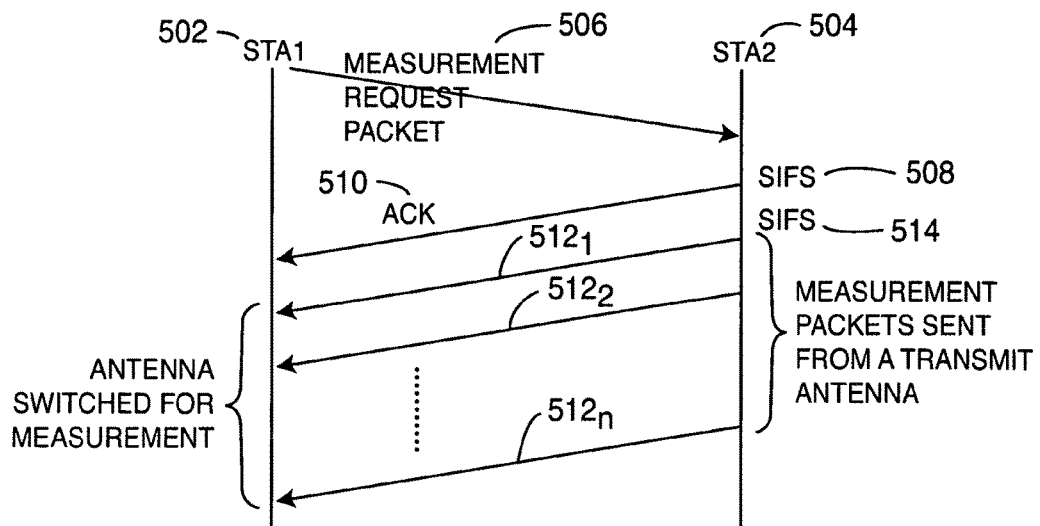
FIG. 5 is a signal diagram of the method shown in FIG. 4.

FIG. 5 is a signal diagram of the method 400, showing the packet exchange between STA1 502 and STA2 504. STA1 502 sends a measurement request packet 506 to STA2 504. STA2 504 waits for a SIFS 508 before sending an ACK 510 in response to the measurement request packet 506. STA2 504 then sends multiple measurement packets $512_1 \ldots 512_n$ consecutively, each measurement packet 512 being separated by a SIFS 514. During the SIFS, STA1 502 changes its receive beam, such that each of the packets $512_1 \ldots 512_n$ is received on a different beam. STA1 502 then uses the received signal strength of each packet 512 to select the correct beam.

Figure 6:
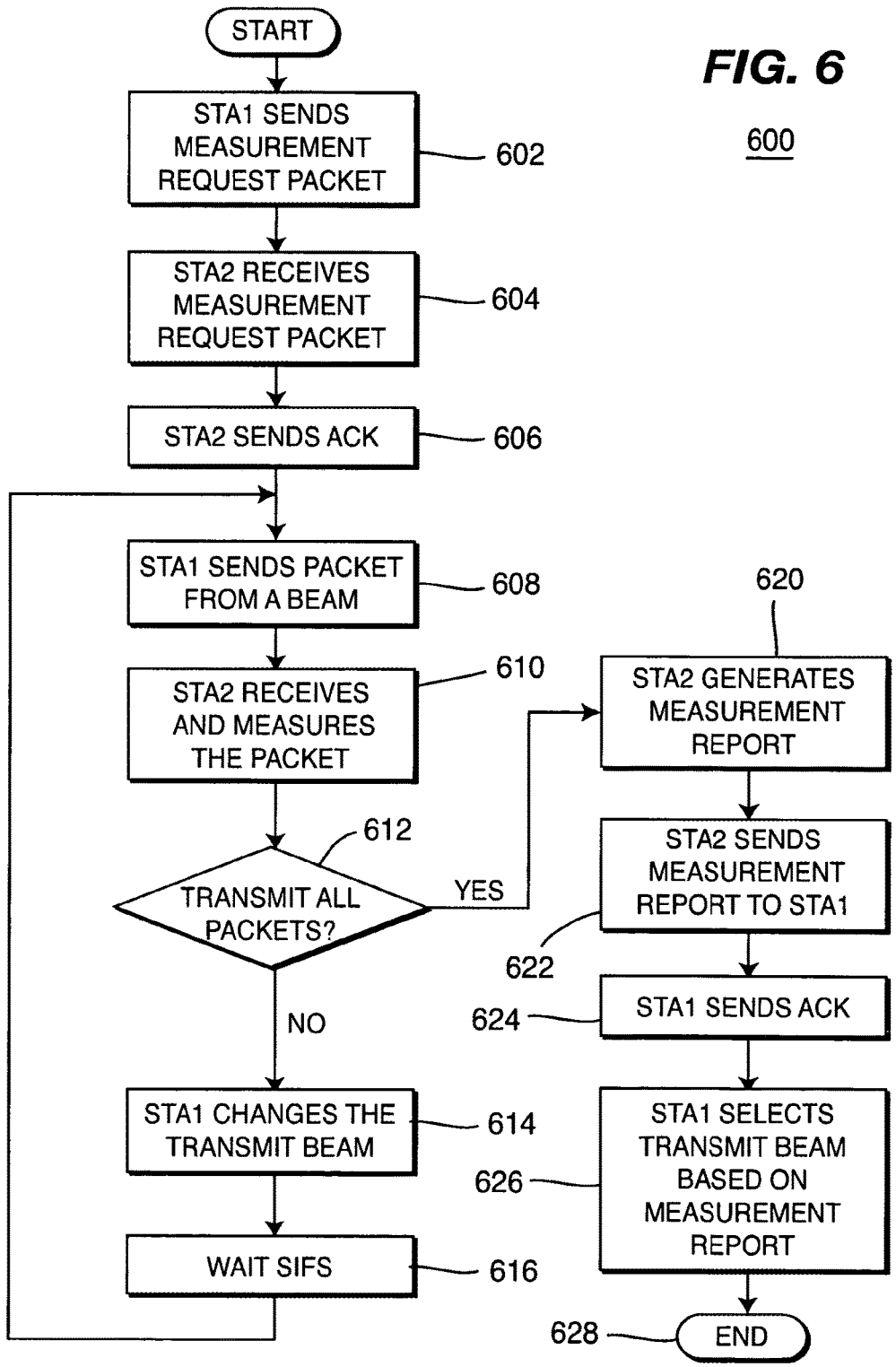
FIG. 6 is a flowchart of a second method for taking antenna measurements in accordance with the present invention.

FIG. 6 is a flowchart of a method 600 for measurement packet exchange between two STAs, STA1 and STA2, in accordance with a second embodiment of the present invention. The method 600 begins with STA1 sending a measurement request packet to STA2 (step 602). STA2 receives the measurement request packet (step 604) and sends an ACK to STA1 (step 606). STA1 sends a measurement packet from a beam (step 608). STA2 receives the measurement packet and measures the RSSI and/or the SNR of the packet (step 610). A determination is made whether all of the measurement packets specified by the measurement request packet have been transmitted (step 612). If all of the measurement packets have not been transmitted, the STA1 changes the transmit beam (step 614), waits for a SIFS (step 616), and sends a packet from the new beam (step 608). In a preferred embodiment, STA1 waits for the SIFS; however, the wait time can vary and be either more or less than the SIFS. The variable nature of the wait period relates to the length of time needed to switch antenna beams, the accuracy of the system clock, and any other implementation-specific timing issues.

If all of the measurement packets have been transmitted (step 612), then STA2 generates a measurement report based on all of the received measurement packets (step 620). STA2 sends the measurement report to STA1 (step 622) and STA1 sends an ACK to STA2 for the measurement report (step 624). STA1 selects a transmit beam based on the measurement report (step 626) and the method terminates (step 628).

Figure 7:
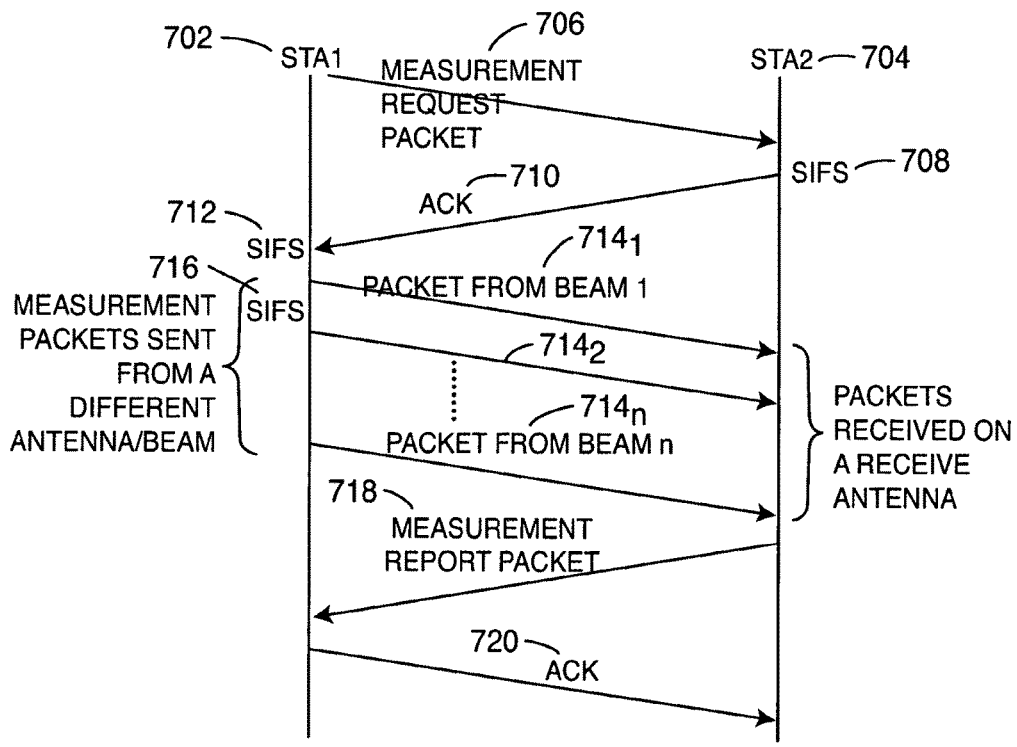
FIG. 7 is a signal diagram of the method shown in FIG. 6.

FIG. 7 is a signal diagram of the method 600, showing the packet exchange between STA1 702 and STA2 704. STA1 702 sends a measurement request packet 706 to STA2 704. STA2 704 waits for a SIFS 708 before sending an ACK 710 in response to the measurement request packet 706. STA1 702 waits for a SIFS 712 before sending a measurement packet $714_1 \ldots 714_n$ from a beam to STA2 704. Each measurement packet 714 is sent from a different beam, and STA1 702 waits for a SIFS 716 before sending a measurement packet 714 on another beam. STA2 704 receives the measurement packets 714 and measures each packet. After all of the measurement packets 714 have been received by STA2 704, STA2 704 generates a measurement report packet 718 and sends it to STA1 702. STA1 702 then sends an ACK to STA2 704 upon receipt of the measurement report packet 718. STA1 702 then selects a beam direction in accordance with the measurement report packet 718.

The measurement request and report information can be piggybacked on a data packet, a management packet, or a control packet. Physical layer signaling can be sent from different beams. This signaling can be sent such that it identifies different beams through some physical layer signature (such as a preamble) or beam information. These measurement signals can be sent in one packet (without waiting for a SIFS).

Passive measurement to update the received signal strength is also possible. The received signal strength from a transmitter may change based on the switched beam or the diversity techniques. A receiver may end up making inaccurate decisions on the correct beam for reception (or transmission) in the absence of any notification about the antenna usage of the transmitter node. The transmitted packet contains the beam identity or diversity method indication. This information can be used by the receiver to update the received measurement information.

The transmit antenna information is sent immediately after the physical layer convergence protocol (PLCP) header or in the medium access control (MAC) header. The information can be a pre-defined signal pattern indicating an omni-directional beam or antenna beam identity. The pattern can also be used to indicate diversity technique (if any).

Figure 8:
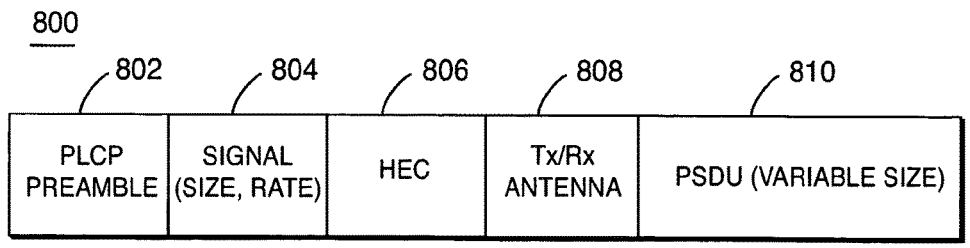
FIG. 8 is a diagram of a physical layer convergence protocol (PLCP) frame format in accordance with the present invention.

FIG. 8 is a diagram of a PLCP frame format 800 in accordance with the present invention. The PLCP frame 800 includes a preamble 802, a signal field 804, a header error check (HEC) 806, and a physical layer service data unit (PSDU) 810. The present invention adds a new field to the PLCP frame 800, a transmit/receive antenna identifier 808. Backward compatibility is maintained by adding transmit antenna information after the PLCP header. An additional information field may also be included in the MAC header to indicate the transmit antenna identity.

The present invention provides an efficient method to measure signal strength to/from a beam or directional antenna. The current 802.11 standards have no defined method for antenna measurement. The use of dummy packets or beacons is inefficient and time consuming. Also, it limits the use of a directional antenna in fading environments and roaming. The present invention allows a STA to use different beams for transmission and reception.

While the present invention has been described in terms of a WLAN, the principles of the present invention are equally applicable to any type of wireless communication system. Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A first station (STA), comprising:
a processor configured to:
send, to a second STA, an indication of a requested number of measurement packets;
receive, at the first STA, the requested number of measurement packets from the second station consecutively, wherein the measurement packets are separated by a short interframe space (SIFS), and wherein the first STA uses a different receive beam for each measurement packet;
measure each of the received measurement packets; and
select a beam based on the measurement of each of the received measurement packets.

2. The first STA of claim 1, wherein the indication of the requested number of measurement packets is provided in a measurement request packet sent by the first STA to the second STA.

3. The first STA of claim 2, wherein the indication provided in the measurement request packet is indicated via a field of the measurement request packet.

4. The first STA of claim 1, wherein each measurement packet includes sequence information.

5. The first STA of claim 1, wherein the processor being configured to select a beam based on the measurement of each of the received measurement packets comprises being configured to use the received signal strength of each packet.

6. The first STA of claim 1, wherein the processor is further configured to receive an ACK from the second STA, wherein the ACK is associated with the measurement request packet, and wherein the ACK is received after a short interframe space (SIFS).

7. A method for use in a first station (STA), the method comprising:
sending, to a second STA, an indication of a requested number of measurement packets;
receiving an ACK from the second STA;
receiving, at the first STA, the requested number of measurement packets from the second station consecutively, wherein the measurement packets are separated by a short interframe space (SIFS), and wherein the first STA uses a different receive beam for each measurement packet;
measuring each of the received measurement packets; and
selecting a beam based on the measurement of each of the received measurement packets.

8. The method of claim 7, wherein the indication of the requested number of measurement packets is provided in a measurement request packet sent by the first STA to the second STA.

9. The method of claim 8, wherein the indication provided in the measurement request packet is indicated via a field of the measurement request packet.

10. The method of claim 7, wherein each measurement packet includes sequence information.

11. The method of claim 7, wherein selecting a beam based on the measurement of each of the received measurement packets comprises using the received signal strength of each packet.

12. The method of claim 7, wherein the ACK is associated with the measurement request packet, and wherein the ACK is received after a short interframe space (SIFS).

* * * * *